3,131,230
ALKYLATION OF AROMATIC COMPOUNDS
George L. Hervert, Downers Grove, and Carl B. Linn, Riverside, Ill., assignors to Universal Oil Products Company, Des Plaines, Ill., a corporation of Delaware
No Drawing. Filed Dec. 27, 1960, Ser. No. 78,333
7 Claims. (Cl. 260—671)

This invention relates to a process for the alkylation of aromatic compounds, and particularly to a process for the alkylation of aromatic hydrocarbons with olefin-acting compounds, in the presence of a catalytic composition of matter. More particularly, the invention is concerned with a process for the alkylation of aromatic hydrocarbons with olefin-acting compounds in the presence of a catalyst comprising boron trifluoride and boron trifluoride modified substantially anhydrous alumina.

It has now been discovered that certain alkylated aromatic hydrocarbons which form an important part of the chemical industry may be prepared in a more economical way and with correspondingly greater yields of the desired products by condensing an alkylatable aromatic compound with an alkylating agent in the presence of the catalytic composition of matter hereinafter more specifically set forth. For example, ethylbenzene is a desired chemical intermediate which is utilizable in large quantities in a dehydrogenation process for the manufacture of styrene, one starting material in the production of some synthetic rubbers, said ethylbenzene being prepared by alkylating benzene with ethylene. Likewise, cumene, which is prepared by reacting benzene with propylene, may be subsequently oxidized to form cumene hydroperoxide, the latter compound being readily decomposed into phenol and acetone, two products which are utilized as intermediates in the preparation of varied chemical products. In addition, para-diisopropylbenzene which may be oxidized to form terephthalic acid, an intermediate in the production of some synthetic fibers, may also be prepared according to the process of this invention. Other products which may also be prepared include alkylated aromatic hydrocarbons boiling within the gasoline boiling range and possessing high anti-knock values which may be used as such, or as components of gasolines suitable for use in automotive engines; or in the alkylation of aromatic hydrocarbons with so-called refinery off-gases or dilute olefin streams, said olefin containing streams having olefin concentrations in quantities so low that such streams have not been utilized satisfactorily as alkylating agents in exitsing processes without prior intermediate olefin concentration steps. However, it has now been found that the water content of the feed stock is an important factor in maintaining the activity of the catalyst at a relatively high level with an attendant high conversion percentage of the olefin-acting compound which acts as the alkylation agent in this reaction. The importance of the water content will be discussed in more detail later on in the specification.

Previously, it has been suggested that boron trifluoride can be utilized as a catalyst for the alkylation of aromatic hydrocarbons with unsaturated hydrocarbons. For example, Hofmann and Wulff succeeded in replacing aluminum chloride by boron trifluoride for catalysis of condensation reactions of the Friedel-Crafts type; (German Patent 513,414, British Patent 307,802, and French Patent 665,812). Aromatic hydrocarbons such as benzene, toluene, tetralin, and naphthalene have been condensed with ethylene, propylene, isononylene, and cyclohexene in the presence of boron trifluoride have been utilized as the catalyst. Similarly, the olefin utilized has been pure or substantially pure. By the use of the process of the present invention, gas streams which are low in olefin concentration may be utilized per se as alkylating agents along with minor amounts of boron trifluoride and substantially complete conversions of the olefin content are obtained.

One embodiment of this invention relates to a process for the production of an alkylaromatic compound which comprises passing to an alkylation zone containing a boron trifluoride modified alumina, alkylatable aromatic compound, olefin-acting compound, and boron trifluoride in an amount not more than about 8 times the molal content of water present in the combined feed, said water being present in said zone in an amount in a range of from about 0.1 to about 400 parts per million molal based on the combined feed, reacting therein said alkylatable aromatic compound with said olefin-acting compound at alkylation conditions in the presence of an alkylation catalyst comprising said boron trifluoride modified alumina, and recovering therefrom alkylated aromatic compound.

A further embodiment of this invention resides in a process for the production of an alkylaromatic hydrocarbon which comprises passing to an alkylation zone containing a boron trifluoride modified substantially anhydrous alumina, selected from the group consisting of gamma-, eta- and theta-alumina, alkylatable aromatic hydrocarbon, olefin-acting compound, and boron trifluoride in an amount not more than about 8 times the molal content of water present in the combined feed, said water being present in said zone in an amount in a range of from about 0.1 to about 400 parts per million molal based on the feed, reacting therein said alkylatable aromatic hydrocarbon with said olefin-acting compound at alkylation conditions in the presence of an alkylation catalyst comprising said boron trifluoride modified substantially anhydrous alumina, and recovering therefrom alkylated aromatic hydrocarbon.

A specific embodiment of this invention resides in a process for the production of ethylbenzene which comprises passing to an alkylation zone containing boron trifluoride modified substantially anhydrous gamma-alumina, benzene, ethylene, and from about 0.4 to about 3200 parts per million molal of boron trifluoride per parts per million molal of water, said water being present in said zone in an amount in a range of from about 0.1 to about 400 parts per million molal based on the benzene and ethylene, reacting therein said benzene with said ethylene at alkylation conditions in the presence of an alkylation catalyst comprising said boron trifluoride and boron trifluoride modified gamma-alumina, and recovering therefrom ethylbenzene.

A more specific embodiment of the invention is found in a process for the production of ethylbenzene which comprises passing to an alkylation zone containing boron trifluoride modified substantially anhydrous gamma-alumina, benzene, ethylene, and from about 8 to about 80 parts per million molal of boron trifluoride per parts per million molal of water, said water being present in said zone in an amount in a range of from about 1 to about 10 parts per million molal based on the benzene and ethylene, reacting therein said benzene with said ethylene at a temperature in the range of from about 0° to about 300° C. and at a pressure in the range of from about atmospheric to about 200 atmospheres in the presence of an alkylation catalyst comprising said boron trifluoride and boron trifluoride modified gamma-alumina, and recovering therefrom ethylbenzene.

Other objects and embodiments referring to altenative alkylatable aromatic compounds and olefin-acting compounds will be found in the following further detailed description of this invention.

It has now been discovered that when utilizing a catalyst comprising a boron trifluoride modified substantially anhydrous inorganic oxide, and when boron trifluoride is suppleid to the reaction zone in the quantity not greater than about 8 times the molal content of water of the combined feed to alkylate an alkylatable aromatic compound with an olefin-acting compound, the amount of water within the feed must not be in excess of 400 p.p.m. (molal) in order to maintain the activity of the catalytic composition of matter at a high rate. This criticality of water will be more specifically illustrated in a subsequent portion of the specification. As hereinbefore set forth, the present invention is concerned with a process for the alkylation of an alkylatable aromatic hydrocarbon with an olefin-acting compound in the presence of a catalyst comprising a boron trifluoride modified substantially anhydrous inorganic oxide and particularly in the presence of a catalyst comprising said inorganic oxide and not more than about 8 times the molal content of water present in the combined feed (alkylatable aromatic compound and olefin-acting compound). The quantity of boron trifluoride which is utilized with the modified inorganic oxide may be appreciably less than 8 times the molal content of water present and conversion of the olefin-acting compound to alkylaromatic compound is still observed. However, when the quantity of boron trifluoride utilized is greater than about 8 times the molal content of water present, side reactions begin to occur which convert the olefin-acting compound to other than the desired alkylaromatic compound. With the introduction of boron trifluoride into the reaction zone in an amount within the range of from about 0.4 to about 3200 parts per million molal per parts per million molal of water present substantially complete conversion of the olefin-acting compound is observed to produce the desired alkylaromatic compounds, even when the olefin-acting compound is present as a so-called diluent in a gas stream, the other components of which are inert under the reaction conditions and which other components decrease a partial pressure of the olefin-present in the alkylation zone. Furthermore, the addition of the limited quantities of boron trifluoride, along with the boron trifluoride modified substantially anhydrous inorganic oxide, results in the attainment of a completeness of reaction which has not been possible prior to this time by other catalysts. The boron trifluoride, which is added in an amount not greater than about 8 times the molal content of water present in the combined feed, may be added continuously, intermittently, or in some cases, the addition may be completely stopped. Thus, the process may be started with the addition of boron trifluoride, for example, within the ranges hereinabove set forth and then discontinued. Depending upon whether or not the boron trifluoride modified substantially anhydrous alumina retains its activity, it may or may not be necessary to add further quantities of boron trifluoride within the above set forth range.

As hereinbefore set forth, it has not been discovered that when an aromatic compound and particularly an alkylatable aromatic hydrocarbon is subjected to alkylation with an alkylating agent in the presence of a catalyst comprising boron trifluoride and boron trifluoride modified substantially anhydrous alumina, the alkylation is incomplete or non-occurring when the water content of the charge to the reactor is less than about 0.1 part per million or more than about 400 parts per million molal based on the feed stock or charge. Therefore, it is important that if the water content of the feed stock is below 0.1 part per million molal, an additional amount of water must be added to raise said water content to the required level or, if the water content of the feed stock or charge is above 400 parts per million molal, the feed stock must be subjected to drying action by passage over an appropriate drying material such as molecular sieves, high surface sodium or other means whereby said water content is reduced to bring it within the critical range. However, as will be shown later the activity or ability of the catalyst which has become deactivated by the absence or overabundance of water will be restored if the water content of the feed is brought within the desired limits.

The preferred catalyst composition comprises boron trifluoride and a boron trifluoride modified substantially anhydrous but not completely dry alumina. Of the various types of alumina which may be successfully and satisfactorily modified with boron trifluoride, it has been found that three crystalline alumina modifications are particularly suitable. These crystalline structures are substantially anhydrous gamma-, eta- and theta-alumina. The exact reason for the specific utility of these three crystalline alumina modifications in the process of this invention is not fully understood, but it is believed to be connected with the number of residual hydroxyl groups on the surface of these particular crystalline alumina modifications. It has been established, for example, that other crystalline alumina modifications such as gamma-alumina trihydrate ($Al_2O_3 \cdot 3H_2O$) or anhydrous alpha-alumina are less active and cannot be utilized in the process of this invention in the same manner as when the substantially anhydrous gamma-, eta-, or theta-aluminas are used whenever complete olefin consumption is required.

The modification of the aluminas with boron trifluoride may be carried out prior to the addition of the alumina to the alkylation reaction zone, or this modification may be carried out in situ. Furthermore, this modification of the alumina with boron trifluoride may be carried out prior to contact of these boron trifluoride modified aluminas with the aromatic hydrocarbon to be alkylated and the olefin-acting compound, or the modification may be carried out in the presence of the aromatic hydrocarbon to be alkylated and the olefin-acting compound. Obviously there is some limitation upon this last mentioned method of alumina modification. The modification of the above mentioned aluminas with boron trifluoride is an exothermic reaction and care must be taken to provide for proper removal of the resultant heat. The modification of the alumina is carried out by contacting the alumina with from about 2% to about 60% by weight boron trifluoride based on the alumina. In one manner of operation, the alumina is placed as a fixed bed in a reaction zone, which may be the alkylation reaction zone, and the desired quantity of boron trifluoride is passed therethrough. In such a case, the boron trifluoride may be utilized in so-called massive amounts or may be used in dilute form diluted with various other gases such as hydrogen, nitrogen, helium, etc. This contacting is normally carried out at room temperature although temperatures up to that to be utilized for the alkylation reaction, that is, temperatures up to about 300° C. may be used. With the preselected alumina at room temperature, utilizing boron trifluoride alone, a temperature wave will travel through the alumina bed during this modification of the alumina with boron trifluoride, increasing the temperature of the alumina from room temperature up to about 150° C. or more. As the boron trifluoride content of the gases to be passed over the alumina is diminished, this temperature increase also diminishes and can be controlled more readily in such instances. In another method for the modification of the above mentioned gamma-, eta- and theta-aluminas with boron trifluoride, the alumina may be placed as a fixed bed in the alkylation reaction zone, the boron trifluoride dissolved in the aromatic hydrocarbon to be alkylated, and the solution of aromatic hydrocarbon and boron trifluoride passed over the alumina at the desired temperature until sufficient boron trifluoride has modified the alumina. When the gas phase treatment of the alumina is carried out, it is noted that no boron trifluoride passes through the alumina bed until all of the alumina has been modified by the boron trifluoride. This same phenomena is observed during the modification of the alumina with the aromatic hydrocarbon solutions containing boron trifluoride. In another method, the modification of the alumina can be accomplished by utilization of a mixture of aromatic hydrocarbon to be alkylated, olefin-acting compound, and boron trifluoride which upon passage over the alumina forms the desired boron trifluoride modified alumina in situ. In the latter case, of course, the activity of the system is low initially and increases as the complete modification of the alumina with the boron trifluoride takes place. The exact manner by which the boron trifluoride modifies the alumina is not understood. It may be that the modification is a result of complexing of the boron trifluoride with the alumina, or it may be that the boron trifluoride reacts with residual hydroxyl groups on the alumina surface. Aside from these considerations there is evidence that BF$_3$ converts alumina at least partly into aluminum fluoride by the reaction $$Al_2O_3 + 2BF_3 \rightarrow 2AlF_3 + B_2O_3$$

or alternately $$Al_2O_3 + 3BF_3 \rightarrow 2AlF_3 + (BOF)_3$$

where (BOF)$_3$ is volatile leaving essentially aluminum fluoride behind. The latter together with additional BF$_3$ may catalyze the aromatic alkylation.

It has been found at any particular preselected temperature for treatment of substantially anhydrous alumina, utilizing either the gamma-, eta- or theta-alumina modifications as set forth hereinabove, that the fluorine content of the treated aluminas attains a maximum which is not rapidly increased by further passage of boron trifluoride over the same. This fluorine or boron trifluoride content of the alumina increases with temperature and depends upon the specific alumina selected. As stated hereinabove, the alumina treatment is, in the preferred embodiment, carried out at a temperature equal to or just greater than the selected reaction temperature so that the alumina will not necessarily tend to be modified further by the boron trifluoride which may be added in amounts not more than about 8 times the molal content of water present in the combined feed during the process and so that control of the aromatic hydrocarbon alkylation reaction is attained more readily. In any case, the alumina resulting from any of the above mentioned boron trifluoride treatments is referred to herein in the specification and claims as boron trifluoride modified substantially anhydrous alumina.

It is also contemplated within the scope of this invention that other inorganic oxides may be modified by boron trifluoride and utilized as catalysts for the process of this invention, although not necessarily with equivalent results. Examples of these inorganic oxides, which are substantially but not completely anhydrous and which are at least to some degree modified by boron trifluoride, include silica, titanium dioxide, chromia, magnesia, silica-alumina, silica-magnesia, etc. When utilizing any of these inorganic oxides, it is necessary that the inorganic oxide from a fairly stable compound with boron trifluoride from which the latter is not readily driven off by heat or reduced pressure.

Alkylatable organic compounds, and particularly alkylatable organic hydrocarbons which may be alkylated by treatment with an alkylating agent in the presence of a catalyst comprising boron trifluoride and a boron trifluoride modified, substantially anhydrous alumina along with the amount of water, include monocyclic aromatic hydrocarbons, that is, benzene hydrocarbons such as benzene, toluene, o-xylene, m-xylene, p-xylene, ethylbenzene, o-ethyltoluene, m-ethyltoluene, p-ethyltoluene, 1,2,3-trimethylbenzene, 1,2,4-trimethylbenzene, 1,3,5-trimethylbenzene, n-propylbenzene, isopropylbenzene, etc. Higher molecular weight alkylaromatic compounds are also suitable as starting materials and include aromatic hydrocarbons such as are produced by the alkylation of aromatic hydrocarbons with olefin polymers. Such products are referred to in the art as alkylate and include hexylbenzene, nonylbenzene, dodecylbenzene, etc. Very often an alkylate is obtained as a high boiling fraction in which the alkyl group attached to the aromatic nucleus varies in size from about C$_9$ to about C$_{18}$. Other suitable alkylatable aromatic hydrocarbons include those with two or more aryl groups, such as diphenyl, diphenylmethane, triphenyl, triphenylmethane, fluorene, stilbene, etc. Examples of other alkylatable aromatic hydrocarbons within the scope of this invention as starting materials contain condensed benzene rings such as naphthalene, alpha-methylnaphthalene, anthracene, pyrene, phenanthrene, naphthacene, rubrene, etc. Of the above alkylatable aromatic hydrocarbons which may be used as starting materials in the process of this invention, the benzene hydrocarbons are preferred, and of the preferred benzene hydrocarbons, benzene itself is particularly preferred.

Suitable olefin-acting compounds or alkylating agents which may be charged in the process of this invention include monoolefins, polyolefins, acetylenic hydrocarbons, and also alkyl chlorides, alkyl bromides, and alkyl iodides. The preferred olefin-acting compounds are olefinic hydrocarbons which comprise mono-olefins having one double bond per molecule and polyolefins which have more than one double bond per molecule. Mono-olefins which may be utilized as olefin-acting compounds or alkylating agents for alkylating alkylatable aromatic hydrocarbons, in the presence of the hereinabove described catalyst are either normally gaseous or normally liquid and include ethylene, propylene, 1-butene, 2-butene, isobutylene, and higher normally liquid olefins such as pentene, hexenes, heptenes, octenes, and higher molecular weight liquid olefins, the latter including various olefin polymers having from about 6 to about 18 carbon atoms per molecule such as propylene trimer, propylene tetramer, propylene pentamer, isobutylene dimer, isobutylene trimer, isobutylene tetramer, etc. Cycloolefins such as cyclopentene, methylcyclopentene, cyclohexene, methylcyclohexene, may be utilized, but generally not under the same conditions of operation applying to non-cyclic olefins. Acetylene and homologs thereof are also useful olefin-acting compounds.

As stated hereinabove, alkylation of the above alkylatable aromatic hydrocarbons may also be effected in the presence of the hereinabove referred to catalyst by reacting aromatic hydrocarbons with certain substances capable of producing olefinic hydrocarbons, or intermediates thereof, under the conditions of operation chosen for the process. Typical olefin producing substances capable of use include alkyl chlorides, alkyl bromides, and alkyl iodides capable of undergoing dehydrohalogenation to form olefinic hydrocarbons and thus containing at least two carbon atoms per molecule. Examples of such alkyl halides include ethyl chloride, normal propyl chloride, isopropyl chloride, normal butyl chloride, isobutyl chloride, secondary butyl chloride, tertiary butyl chloride, amyl chlorides, hexyl chlorides, etc., ethyl bromide, normal propyl bromide, isopropyl bromide, normal butyl bromide, isobutyl bromide, secondary butyl bromide, tertiary butyl bromide, amyl bromides, hexyl bromides, etc., ethyl iodide, normal propyl iodide, etc.

As hereinabove set forth, olefin hydrocarbons, especially normally gaseous olefin hydrocarbons, are particularly preferred olefin-acting compounds or alkylating agents for use in the process of the present invention. As stated, the process can be successfully applied to and utilized for conversion of olefin hydrocarbons when these olefin hydrocarbons are present in minor quantities in gas streams. Thus, in contrast to prior art processes, the normally gaseous olefin hydrocarbon for us in the process of the present invention, need not be purified or concentrated. Such normally gaseous olefin hydrocarbons appear in minor concentrations in various refinery gas streams, usually diluted with various unreactive gases such as hydrogen, nitrogen, methane, ethane, propane, etc. These gas streams containing minor quantities of olefin hydrocarbon are obtained in petroleum refineries from various refinery installations including thermal cracking units, catalytic cracking units, thermal reforming units, coking units, polymerization units, etc. Such refinery gas streams have in the past often been burned for fuel value since an economical process for their utilization as alkylating agents or olefin-acting compounds has not been available except where concentration of the olefin hydrocarbons has been carried out concurrently therewith. This is particularly true for refinery gas streams containing relatively minor quantities of olefin hydrocarbons such as ethylene. Thus, it has been possible catalytically to polymerize propylene and/or various butenes in refinery gas streams but the off-gases from such processes still contain ethylene. Prior to our invention it has been necessary to purify and concentrate this ethylene or to use it for fuel. These refinery gas streams containing minor quantities of olefin hydrocarbons are known as off-gases. In addition to containing minor quantities of olefin hydrocarbons such as ethylene, propylene, and the various butenes, depending upon their source, they contain varying quantities of nitrogen, hydrogen, and various normally gaseous paraffinic hydrocarbons. Thus, a refinery off-gas ethylene stream may contain varying quantities of hydrogen, nitrogen, methane, and ethane with the ethylene in minor proportion, while a refinery off-gas propylene stream is normally diluted with propane and contains the propylene in minor quantities, and a refinery off-gas butene stream is normally diluted with butanes and contains the butenes in minor quantities. A typical analysis in mole percent for a utilizable refinery off-gas from a catalytic cracking unit is as follows: nitrogen, 4.0%; carbon monoxide, 0.2%; hydrogen, 5.4%; methane, 37.8%; ethylene, 10.3%; ethane, 24.7%; propylene, 6.4%; propane, 10.7% and $C_4$ hydrocarbons 0.5%. It is readily observed that the total olefin content of this gas stream is 16.7 mole percent and the ethylene content is even lower, namely 10.3 mole percent. Such gas streams containing olefin hydrocarbons in minor or dilute quantities are particularly preferred alkylating agents or olefin-acting compounds within the broad scope of the present invention. It is readily apparent that only the olefin content of such gas streams undergoes reaction in the process of this invention, and that the remaining gases free from olefin hydrocarbons are vented from the process.

In accordance with the process of the present invention, the alkylation of alkylatable aromatic hydrocarbons with olefin-acting compounds react to produce alkylated aromatic hydrocarbons of higher molecular weight than those charged to the process is effected in the presence of the above indicated catalyst at a temperature of from about 0° C. or lower to about 300° C. or higher, and preferably from about 20° to about 230° C., although the exact temperature needed for a particular aromatic hydrocarbon alkylation reaction will depend upon the alkylatable aromatic hydrocarbon and olefin-acting compound employed. The alkylation reaction is usually carried out at a pressure of from about substantially atmospheric to about 200 atmospheres. The pressure utilized is usually selected to maintain the alkylatable aromatic hydrocarbon in substantially liquid phase. Within the above temperature and pressure ranges, it is now always possible to maintain the olefin-acting compound in liquid phase. Thus, when utilizing a refinery off-gas containing minor quantities of ethylene, the ethylene will be dissolved in the liquid phase alkylatable aromatic hydrocarbon to the extent governed by temperature, pressure, and solubility considerations. However, a portion thereof undoubtedly will be in the gas phase. When possible, it is preferred to maintain all of the reactants in liquid phase. Such is not always possible, however, as set forth hereinabove. Referring to the aromatic hydrocarbon subjected to alkylation, it is preferable to have present from 2 to 10 or more, sometimes up to 20, molecular proportions of alkylatable aromatic hydrocarbon per one molecular proportion of olefin-acting compound introduced therewith to the alkylation zone. The higher molecular ratios of alkylatable aromatic hydrocarbon to olefin are particularly necessary when the olefin employed in the alkylation process is a high molecular weight olefin boiling generally higher than pentenes, since these olefins frequently undergo depolymerization prior to or substantially simultaneously with alkylation so that one molecular proportion of such an olefin can thus alkylate two or more molecular proportions of the alkylatable aromatic hydrocarbon. The higher molecular ratios of alkylatable aromatic hydrocarbon to olefin also tend to reduce the formation of polyalkylated products because of the operation of the law of mass action under these conditions.

As hereinbefore set forth the process of this invention is effected by alkylating an aromatic hydrocarbon with an olefin-acting compound of the type hereinbefore set forth, in the presence of a critical amount of water and a catalyst comprising boron trifluoride and boron trifluoride modified substantially anhydrous alumina. It has now been discovered that partially deactivated catalysts which had become deactivated due to the fact that the water content of the charge to the reactor was less than about 0.1 part per million molal of the combined feed may be restored to almost full activity when utilizing a feed stock in which the water content is in the range of from about 0.1 to about 400 parts per million molal and preferably from about 1 to about 10 parts per million molal. In addition, the catalyst of the type hereinbefore set forth will also become deactivated when the charge contains more than the aforesaid upper limit, that is, more than 400 parts per million molal. Therefore as hereinafter shown in a more detailed and specific manner it is necessary and critical, that the combined feed stock contain the requisite amount of water. In usual cases the alkylatable aromatic compound will usually contain the greater amount of water and therefore said compound will be either subjected to a thorough drying or, if necessary, hydration in order to keep the water content of the combined feed stock within the critical range.

It is also contemplated within the scope of this invention that the alkylation process herein described may be effected in any suitable manner and may comprise either a batch or continuous type operation. The actual operation of the process admits of some modification depending upon the normal phase of the reacting constituents, whether the catalyst utilized is not more than 8 times the molal content of water present in the combined feed along with the boron trifluoride modified aromatic, or said boron trifluoride modified alumina alone and whether batch or continuous type operations are used. In one type of batch operation, an aromatic hydrocarbon to be alkylated, such as, for example, benzene is brought to a temperature and pressure within the approximate range specified in the presence of a catalyst comprising boron trifluoride and boron trifluoride modified substantially anhydrous gamma-, eta- or theta-alumina, having a concentration corresponding to a sufficiently high activity. Water in an amount sufficient to bring the concentration within the desired limits hereinbefore set forth may be added if necessary, or removed from the feed stock by any means known in the art prior to introduction of the feed stock to the reaction zone, and alkylation of the benzene is thereafter effected by the gradual introduction under pressure of an olefin such as ethylene in a manner to attain contact of the catalyst with the reactants. After a sufficient residence time at desired temperature and pressure, the gases, if any, are vented and the alkylated aromatic hydrocarbon is separated from the unreacted starting materials and other reaction products.

In another manner of operation, the aromatic hydrocarbon may be mixed with the olefin at a suitable temperature in the presence of sufficient boron trifluoride modified alumina, and boron trifluoride is then added to attain an amount in the range of from about 0.4 to about 3200 parts per million molal per parts per million of water present. Following this, the reaction is induced by a sufficient long contact time with the catalyst. As in the prior process, the amount of water present in the reaction mixture is maintained in a range of between 0.1 part per million and 400 parts per million molal and preferably at a range of about 1 part per million to 10 parts per million molal, said water content being present by the addition of a sufficient amount of water necessary to meet this range or, in the alternative, if the water content of the feed stock is over the maximum limit, by passing the feed stock over drying surfaces of the type hereinbefore set forth in order to reduce said water content to meet the necessary qualifications. In the aforementioned batch type method, alkylation may be allowed to progress to different stages depending upon the contact time. In the case of the alkylation of benzene with normally gaseous olefins, the most desirable product is today obtained by the utilization in the process of molar quantities of benzene exceeding those of the olefin.

In a batch type of operation, the amount of boron trifluoride modified alumina utilized will range from about 1% to about 50% by weight based on the aromatic hydrocarbon. With this quantity of boron trifluoride modified alumina, and boron trifluoride as set forth hereinabove, the contact time may be varied from about 0.1 to about 25 hours or more. Contact time is not only dependent upon the quantity of catalyst utilized but also upon the efficiency of mixing, shorter contact times being attained by increasing mixing. After batch treatment, the boron trifluoride component of the catalyst is removed in any suitable manner, such as by venting or caustic washing, the organic layer or fraction is decanted or filtered from the boron trifluoride modified alumina, and the organic product or fraction is then subjected to separation such as by fractionation for the recovery of the desired reaction product or products.

In one type of continuous operation, a liquid aromatic hydrocarbon, such as benzene, containing dissolved therein the requisite amount of boron trifluoride, may be pumped through a reactor containing a bed of solid boron trifluoride modified alumina. The olefin-acting compound may be added to the aromatic hydrocarbon stream prior to contact of this stream with the solid alumina bed, or it may be introduced at various points in the alumina bed, and it may be introduced continuously or intermittently, as set forth above. In this type of an operation, the hourly liquid space velocity of the aromatic hydrocarbon reactant will vary from about 0.25 to about 20 or more. The details of continuous processes of this general character are familiar to those skilled in the alkylation of aromatic hydrocarbons art and any necessary additions or modifications of the above general procedures will be more or less obvious and can be made without departing from the broad scope of this invention.

The following examples are given to illustrate the process of the present invention which, however, are not intended to limit the generally broad scope of the present invention in strict accordance therewith.

EXAMPLE I

In this example the reaction tube was charged with substantially anhydrous gamma-alumina prepared from $\frac{1}{16}''$ diameter alumina spheres. The alumina spheres were dried for about 17 hours at about 200° C. and thereafter calcined at about 675° C. for an additional two hours. The alumina had the following physical properties: surface area, 146 square meters per gram; pore volume, 0.591 cubic centimeter per gram; pore diameter, 162 A.; and an apparent bulk density of 0.526 gram per milliliter. A volume of 60 milliliters (31.5 grams) of the $\frac{1}{16}''$ diameter spheres was charged to the reactor.

The experiments were conducted in a once through bench scale processing unit consisting of liquid and gas charge pumps, reaction tube, high pressure gas separator, pressure controller and liquid and gas collection systems. The reactor effluent was collected in the high pressure separator at reactor pressure. Boron trifluoride was metered into the reaction system continuously into a charger under pressure. Prior to contacting the gamma-alumina with the hydrocarbons, the reactor containing the gamma-alumina was slowly pressured to about 50 p.s.i.g. with boron trifluoride. A temperature wave, increasing from the ambient temperature up to about 60° C. traveled through the alumina bed during this initial addition of the boron trifluoride. The boron trifluoride was in contact with the gamma-alumina for a period of about 1 hour.

The temperature of the reactor was then increased to 150° C. and the reactants were charged thereto. The dried benzene charge consisted of thiophene-free benzene dried in bulk storage over calcium chloride to a water content of 109 parts per million by weight and further dried by passage at a LHSV of 0.28 through a drier containing high surface sodium thereby reducing the water content to an average of 220 parts per million molal. A blend of 8.4–10.4 mole percent of ethylene and the balance consisting of dry nitrogen was used as the olefin charge. Before entry into said reactor the olefin charge was pumped through a high surface sodium drier at an average hourly space velocity of 4.75 at 300 p.s.i.g., the water content equaling about 12 parts per million molal.

The conditions under which this experiment was run were benzene-ethylene mole ratio, 9.2; $BF_3$ input, 158–222 parts per million molal; a benzene liquid hourly space velocity of 1.5; a temperature of 150° C.; and a pressure of 500 p.s.i.g. After a continuous run of about 96 hours during which time the ethylene conversion reached about 99% the high surface sodium drier was bypassed and undried benzene containing a water content of about 777 parts per million molal was charged thereto. As will be noted from the following table the ethylene conversion dropped to about 5%, the deactivation of the catalyst occurring in a very rapid manner. Following this the original activity of the catalyst was restored by reducing the water content of the benzene charge within the range hereinbefore set forth, that is, to about 220 parts per million molal, and increasing the boron trifluoride input. The results of these tests are set forth in Table I below.

*Table I*

| On stream Hrs. | 0–96 | 96–137 | 137–162 | 162–191 | 191–359 |
|---|---|---|---|---|---|
| Catalyst: | | | | | |
| ML | 60 | 60 | 60 | 60 | 60 |
| $BF_3$ Input, Gm./Hr. | 0.0017 | 0.0017 | 0.0017 | 0.053 | 0.012 |
| Ethylene Feed: | | | | | |
| Composition | (¹) | (¹) | (¹) | (¹) | (¹) |
| $H_2O$ Content, p.p.m. (Molal) | 3 | 3 | 3 | 3 | 3 |
| Benzene Feed: | | | | | |
| Type | (²) | (²) | (²) | (²) | (²) |
| $H_2O$ Content, p.p.m. (Molal) | 220 | 777 | 220 | 220 | 220 |
| Conditions: | | | | | |
| Benzene Drier in Use | Yes | No | Yes | Yes | Yes |
| Benzene/Ethylene, Moles | 9.2 | 9.2 | 9.2 | 9.2 | 9.2 |
| $BF_3$ Input, p.p.m. (Molal) | 222 | 222 | 222 | 704 | 155 |
| Benzene, LHSV | 1.48 | 1.48 | 1.48 | 1.48 | 1.48 |
| Furnace Block Temp., °C | 150 | 149 | 150 | 150 | 149 |
| Catalyst Bed Temp. °C.— | | | | | |
| 1″ from Top | 156 | 142 | 143 | 152 | 156 |
| Middle | 156 | 145 | 148 | 157 | 158 |
| 1″ from Bottom | 151 | 146 | 148 | 154 | 152 |
| Reactor Press., p.s.i.g. | 500 | 500 | 499 | 500 | 500 |
| Results: | | | | | |
| Percent Ethylene Conversion | 18→99 | 99→5 | 5→18 | 18→90 | 90→99 |

¹ 8.4–10.4 Mol percent $C_2H_4$; Balance $N_2$.
² Thiophene-free.

It will be noted from the above table that the activity of the catalyst hereinbefore described will result in an increase of ethylene conversion until a figure of about 99% has been reached, while the deactivation of the catalyst occurs in a very rapid manner when undried benzene containing a water content in excess of the critical range hereinbefore set forth contacts the catalyst, the catalyst activity being reduced from about 99% to about 5% ethylene conversion. It is further noted that the activity of the catalyst may be restored following deactivation of said catalyst by water. The above table shows that catalyst activity may be completely restored by reducing the input of water within the benzene charge from 777 parts per million to about 220 parts per million and increasing the boron trifluoride input, the table showing that after about 161 hours of operation the catalyst activity is completely restored.

The above table therefore illustrates that the water content of the feed in the alkylation of alkylatable aromatic compounds utilizing a catalyst of the type comprising boron trifluoride and a boron trifluoride substantially anhydrous alumina must lie within a critical range, said range being from about 0.1 to about 400 parts per million molal based on the feed and preferably in a range of from about 1 part per million to about 10 parts per million molal.

EXAMPLE II

A catalyst is prepared in a manner similar to that set forth in Example I above by calcining theta-alumina spheres at a temperature of about 1200° C. for two hours after said spheres are dried for about 17 hours at 200° C. X-ray diffraction analyses of the calcined spheres indicate that the resulting material is substantially all theta-alumina. The theta-alumina spheres are charged to a reactor following which the reactor is slowly pressured to about 50 p.s.i.g. with boron trifluoride. A temperature wave which will increase from the ambient temperature up to about 60° C. will travel through the alumina bed during the initial addition of the boron trifluoride. Upon completion of the boron trifluoride addition which will be in contact with the theta-alumina for a period of about one hour the reaction temperature is increased to 150° C. and the feed comprising ethylene and benzene which has been processed in a manner similar to that set forth in Example I above is charged to the reaction zone. The alkylation of the benzene with ethylene, the combined feed containing a water content of about 224 parts per million molal, will be effected at a temperature of about 150° C., a pressure of about 500 p.s.i.g., a benzene to ethylene mole ratio of about 9.2, a $BF_3$ input of from about 158 to about 222 parts per million molal and a benzene liquid hourly space velocity of 1.5. Under these conditions the conversion of ethylene will be about 99%, said conversion percentage dropping rapidly if the benzene-ethylene feed contains less than 0.1 part per million or more than about 400 parts per million molal of water present in the combined feed.

We claim as our invention:

1. In the alkylation of an alkylatable aromatic compound with an olefin-acting compound in a reaction zone containing a catalyst comprising boron trifluoride modified substantially anhydrous alumina selected from the group consisting of gamma-, eta- and theta-alumina, the method of maintaining said catalyst at a high level of activity which comprises introducing water to said zone in an amount of from about 0.1 part per million to about 400 parts per million molal based on the combined feed of said compounds, and also introducing to said zone boron trifluoride in an amount not more than about 8 times the molal content of said water.

2. In the alkylation of an alkylatable aromatic hydrocarbon with an olefinic hydrocarbon in a reaction zone containing a catalyst comprising boron trifluoride modified substantially anhydrous alumina selected from the group consisting of gamma-, eta- and theta-alumina, the method of maintaining said catalyst at a high level of activity which comprises introducing water to said zone in an amount of from about 0.1 part per million to about 400 parts per million molal based on the combined feed of said hydrocarbons, and also introducing to said zone boron trifluoride in an amount not more than about 8 times the molal content of said water.

3. In the alkylation of an alkylatable aromatic compound with an olefin-acting compound in a reaction zone containing a catalyst comprising boron trifluoride modified substantially anhydrous alumina selected from the group consisting of gamma-, eta- and theta-alumina, the method of maintaining said catalyst at a high level of activity which comprises introducing water to said zone in an amount of from about 0.1 part per million to about 400 parts per million molal based on the combined feed of said compounds, and also introducing to said zone from about 0.4 to about 3200 parts per million molal of boron trifluoride per parts per million molal of water.

4. In the alkylation of an alkylatable aromatic hydrocarbon with an olefinic hydrocarbon in a reaction zone containing a catalyst comprising boron trifluoride modified substantially anhydrous alumina selected from the group consisting of gamma-, eta- and theta-alumina, the method of maintaining said catalyst at a high level of activity which comprises introducing water to said zone in an amount of from about 0.1 part per million to about 400 parts per million molal based on the combined feed of said hydrocarbons, and also introducing to said zone from about 0.4 to about 3200 parts per million molal of boron trifluoride per parts per million molal of water.

5. The process of claim 4 further characterized in that said aromatic hydrocarbon is a benzene hydrocarbon.

6. In the alkylation of benzene with ethylene in a reaction zone containing a catalyst comprising boron trifluoride modified substantially anhydrous gamma-alumina, the method of maintaining said catalyst at a high level of activity which comprises introducing water to said zone in an amount of from about 0.1 part per million to about 400 parts per million molal based on the combined feed of benzene and ethylene, and also introducing to said zone boron trifluoride in an amount not more than about 8 times the molal content of said water.

7. The process of claim 6 further characterized in that the amount of boron trifluoride introduced to said zone is in the range of about 4 to about 40 parts per million molal per parts per million molal of water.

References Cited in the file of this patent

UNITED STATES PATENTS

| 2,376,119 | Bruner et al. | May 15, 1945 |
| 2,570,407 | Upham | Oct. 9, 1951 |
| 2,804,491 | May et al. | Aug. 27, 1957 |
| 2,939,890 | Hervert et al. | June 7, 1960 |